(12) United States Patent
Raffoni

(10) Patent No.: US 6,276,886 B1
(45) Date of Patent: Aug. 21, 2001

(54) LAMINAR STAPLE FOR CORNER JOINTING PROFILED STRIPS

(76) Inventor: Giuseppe Raffoni, Via D. Bolognesi, 24, 47100 Forli' (IT)

(*) Notice: Subject to any disclaimer, the term of this patent is extended or adjusted under 35 U.S.C. 154(b) by 0 days.

(21) Appl. No.: 09/453,288

(22) Filed: Dec. 3, 1999

(30) Foreign Application Priority Data

Aug. 2, 1999 (IT) .............................................. B099A0440

(51) Int. Cl.[7] .................................................. F16B 15/00
(52) U.S. Cl. .......................................................... 411/478
(58) Field of Search .................................... 411/478, 477, 411/461, 464, 412; 706/343, 344

(56) References Cited

U.S. PATENT DOCUMENTS

| | | | |
|---|---|---|---|
| 3,431,810 | * | 3/1969 | Black .................................... 411/478 |
| 4,681,498 | * | 7/1987 | Raffoni ................................. 411/478 |
| 4,718,804 | * | 1/1988 | Cassese ................................ 411/478 |
| 4,925,352 | * | 5/1990 | Sundberg ............................. 411/478 |
| 5,193,959 | * | 3/1993 | Motta .................................... 411/478 |

FOREIGN PATENT DOCUMENTS

2629151 * 9/1989 (FR) .................................... 411/477

* cited by examiner

*Primary Examiner*—Flemming Saether
(74) *Attorney, Agent, or Firm*—Guido Modiano; Albert Josif; Daniel O'Byrne

(57) ABSTRACT

A laminar staple comprising two walls arranged at an angle and two ribs which protrude laterally from the walls; the walls and the ribs form a substantially W-shaped profile which has a cutting edge at one end and a striking edge at the opposite end; the staple is peculiar in that the ribs enclose, by means of their respective walls, an angle whose value decreases from the cutting edge to the striking edge.

5 Claims, 14 Drawing Sheets

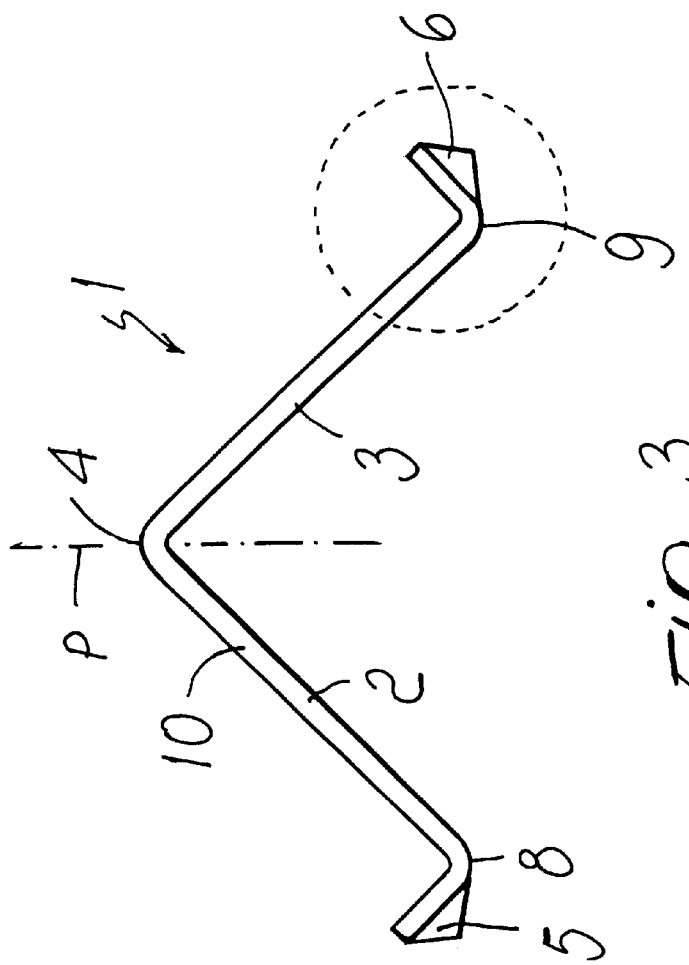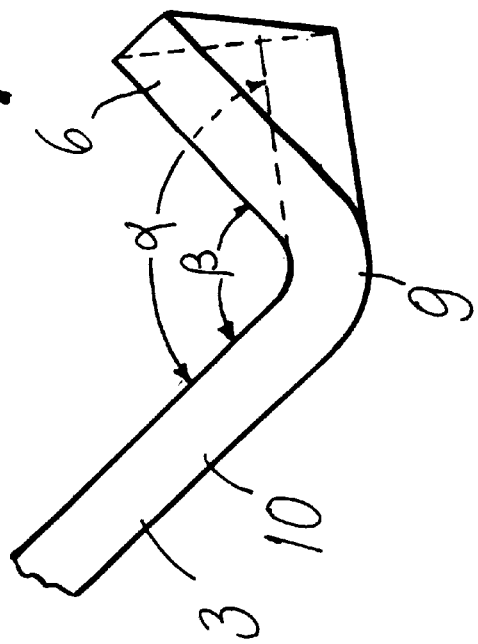

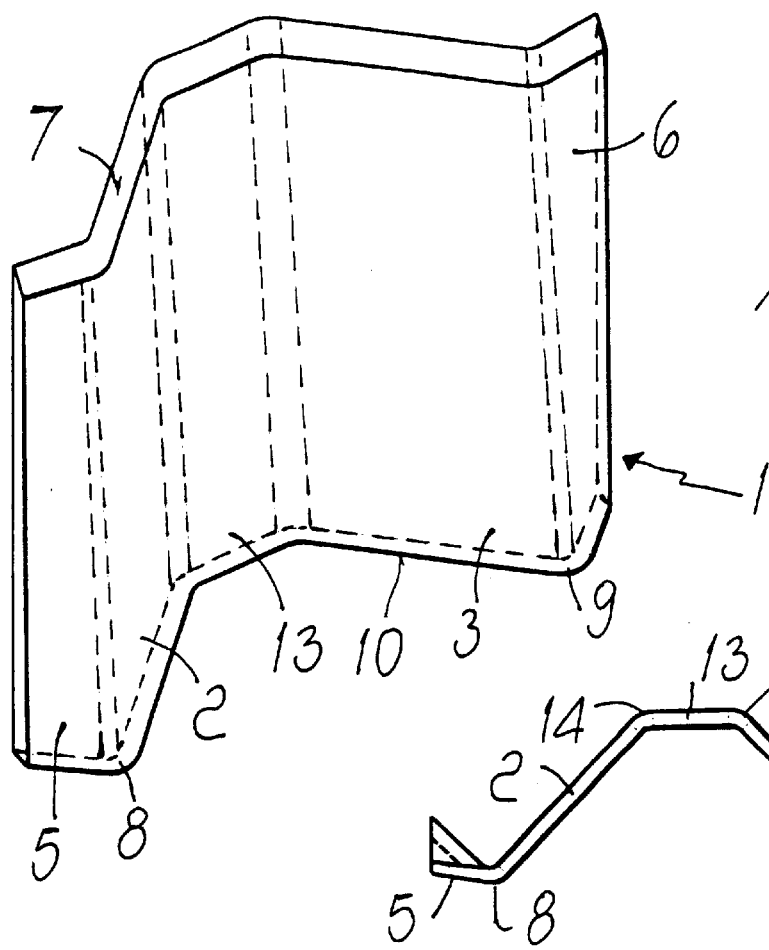
Fig. 7
Fig. 6
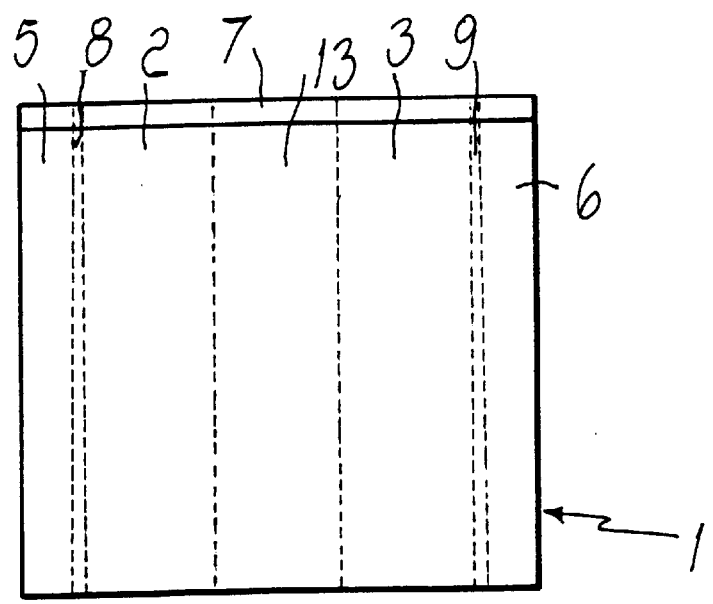
Fig. 5

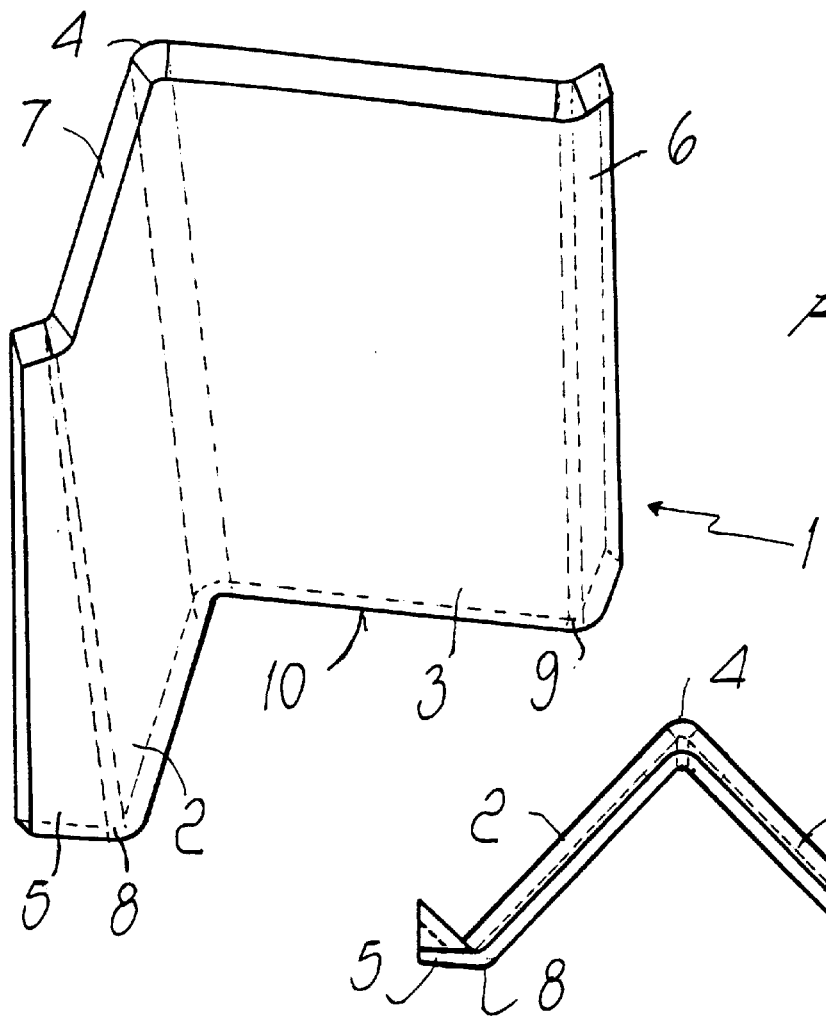
Fig. 10
Fig. 9
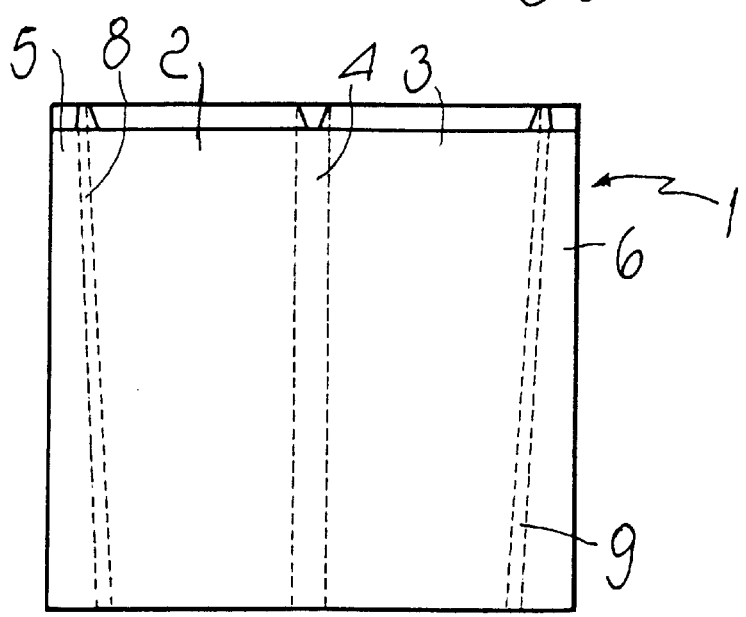
Fig. 8

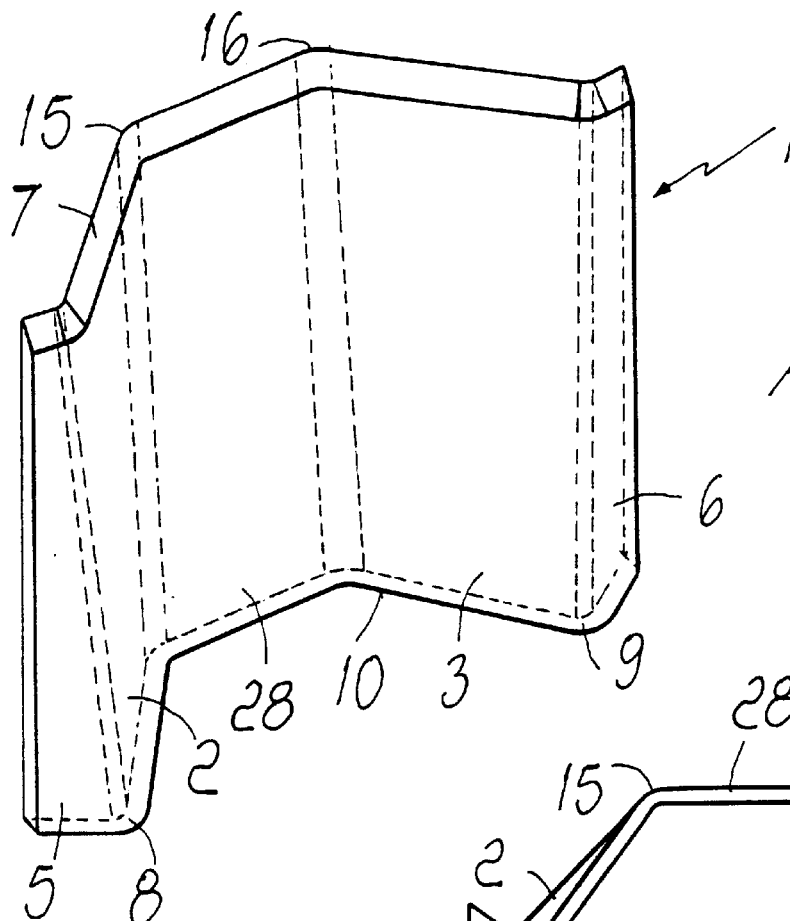
Fig. 13
Fig. 12
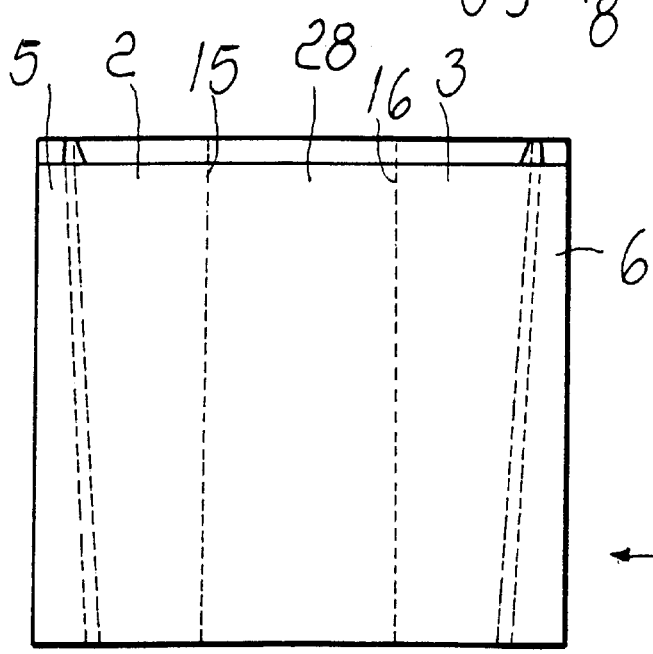
Fig. 11

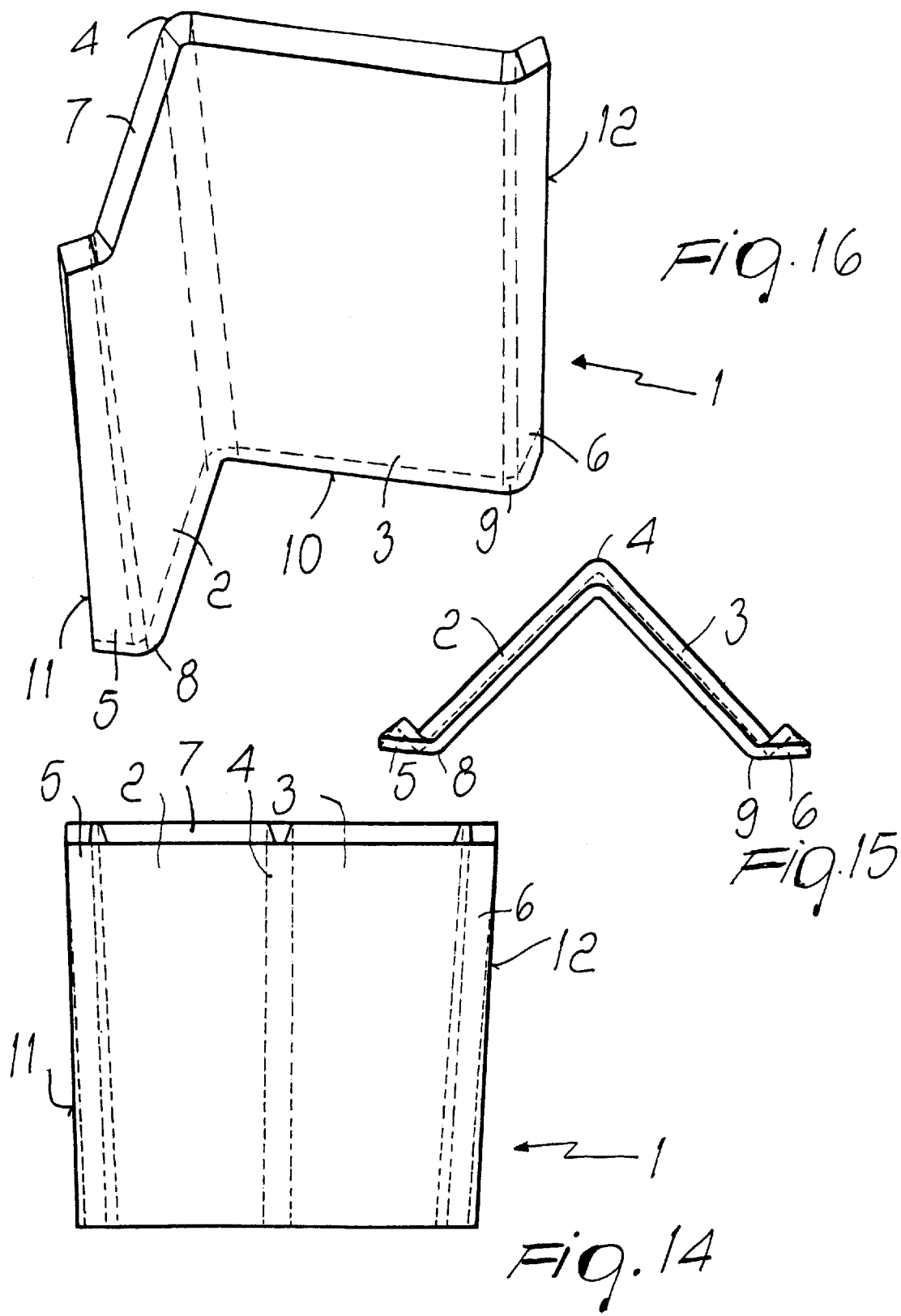

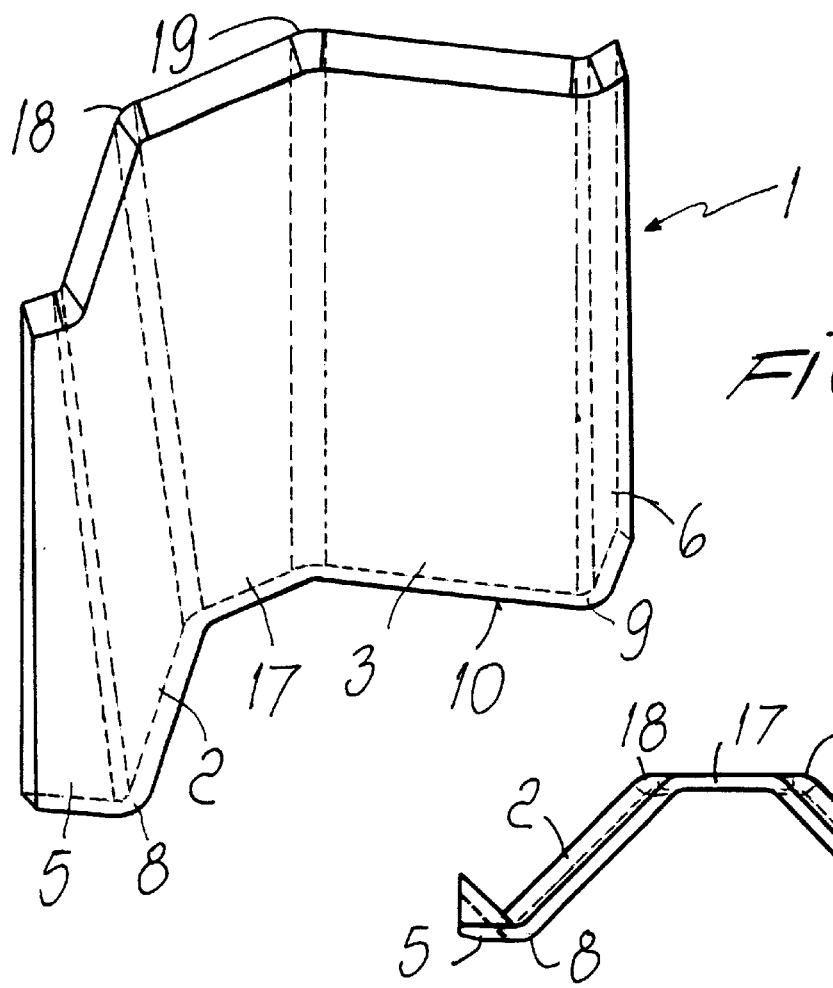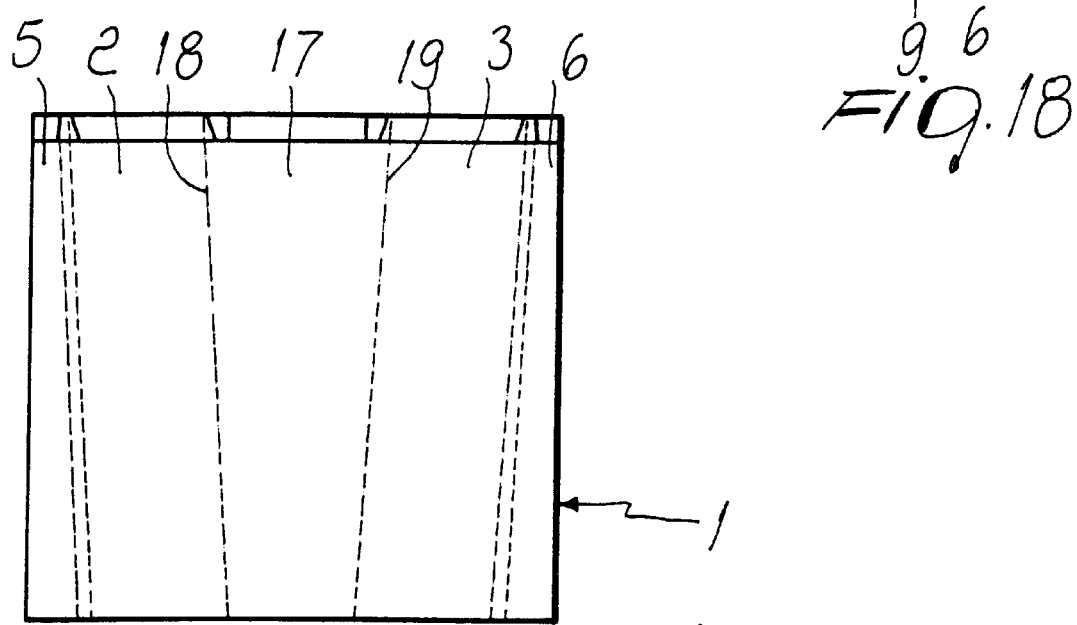

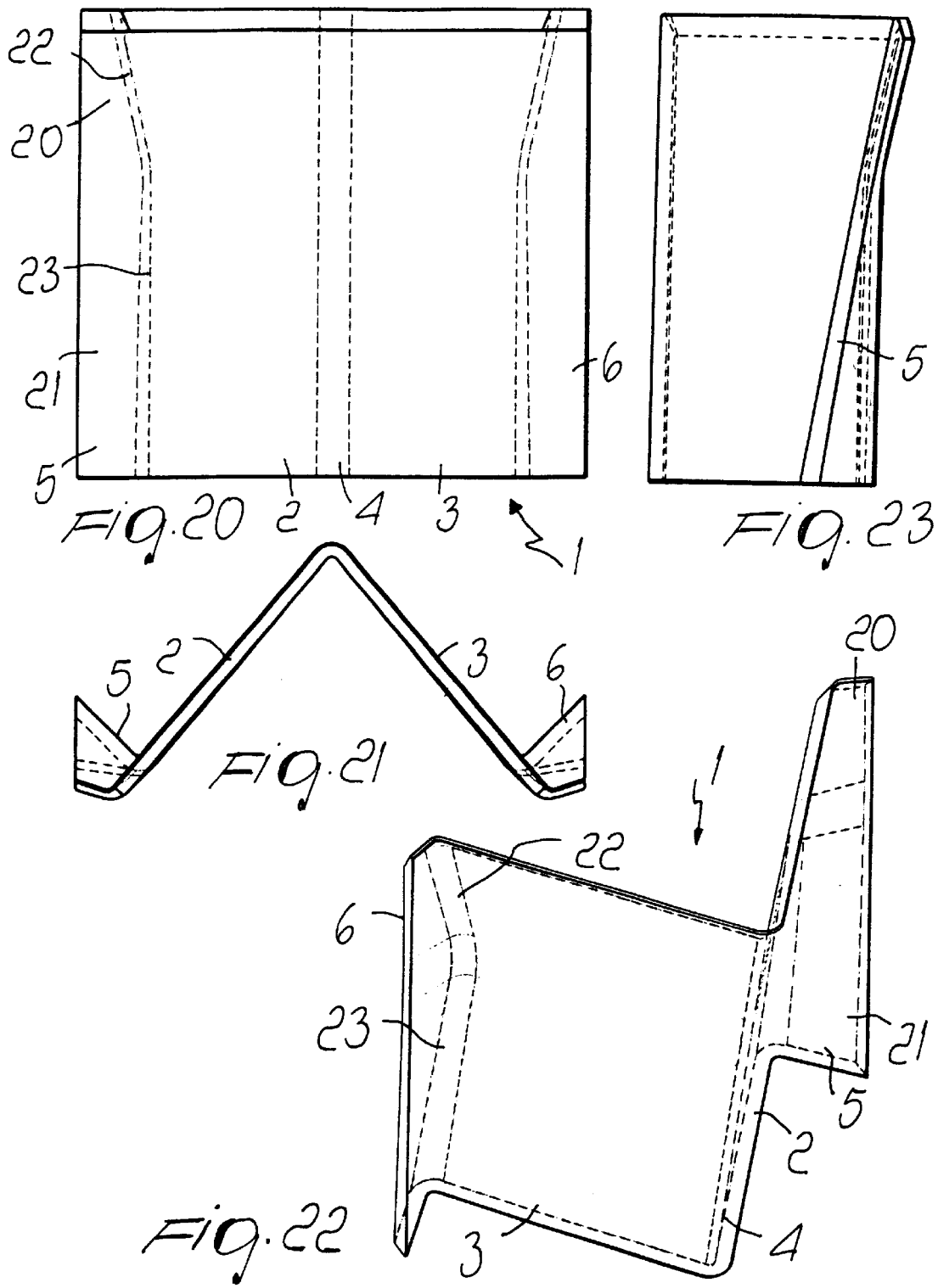

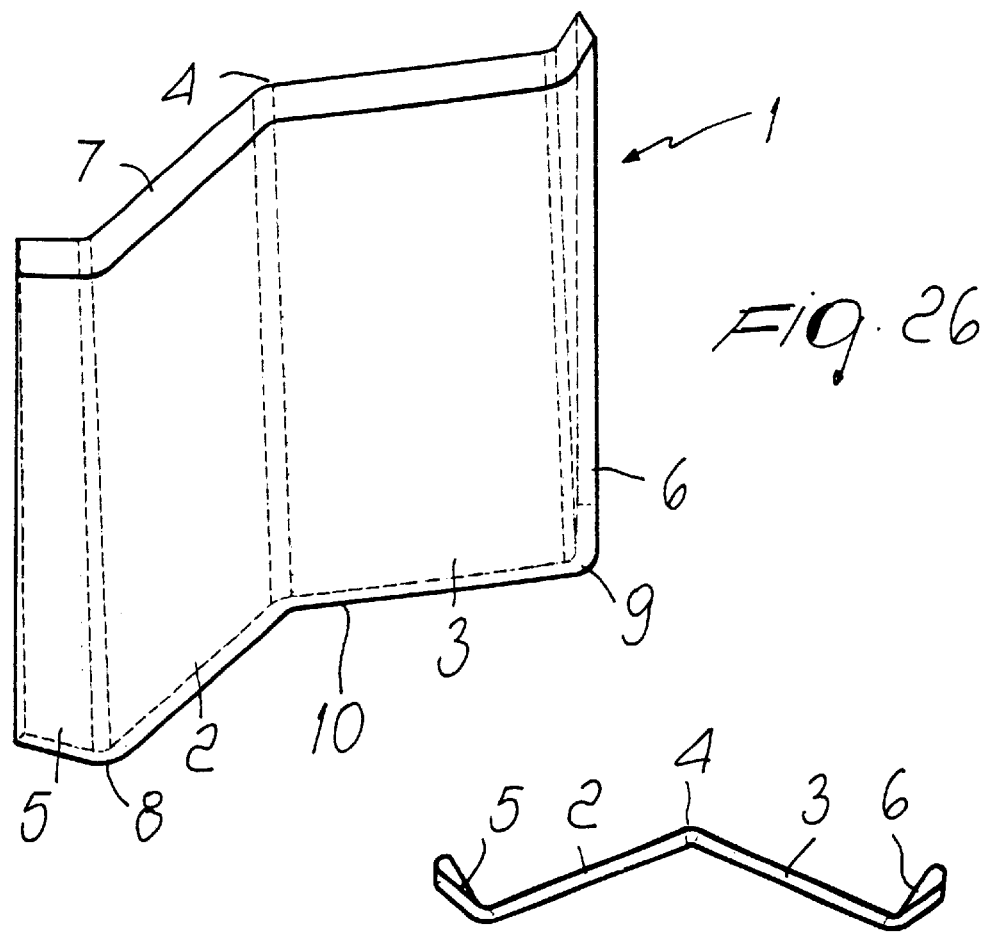
Fig. 26
Fig. 25
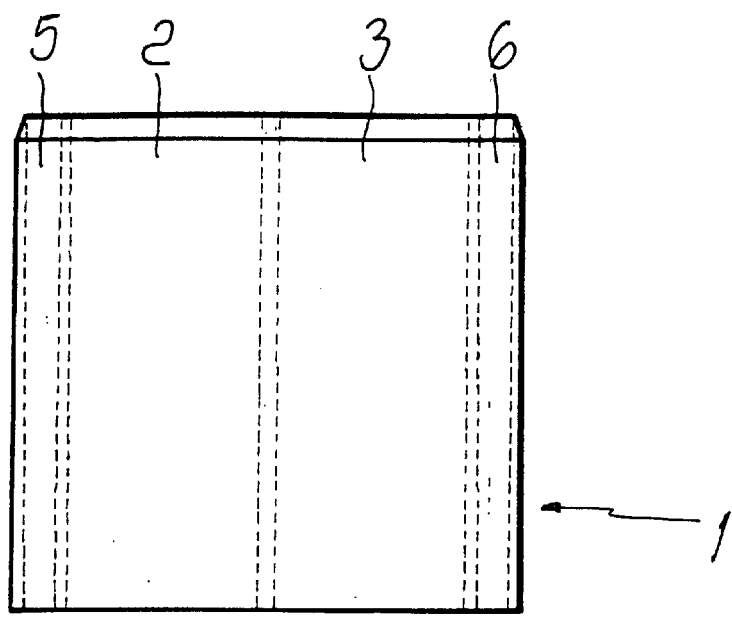
Fig. 24

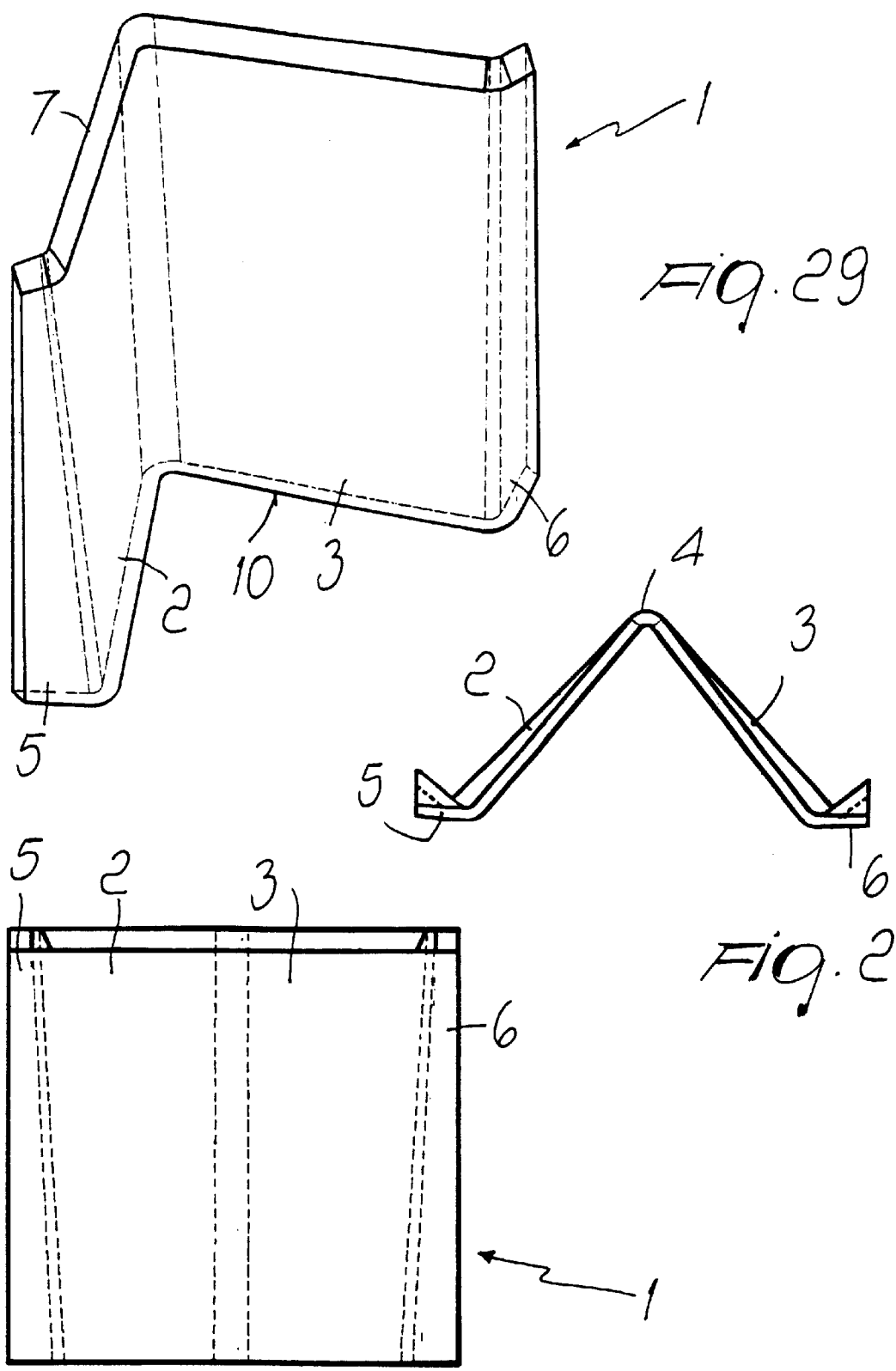

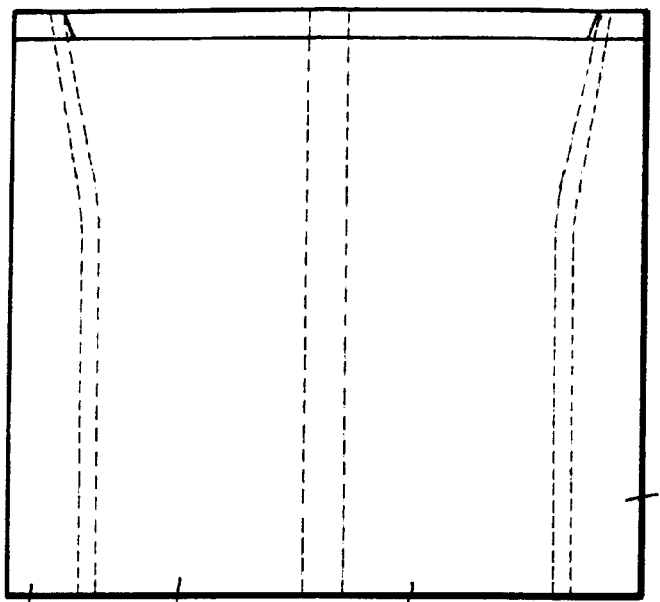
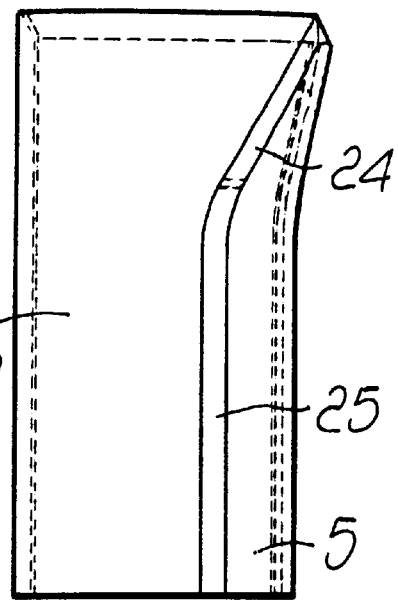
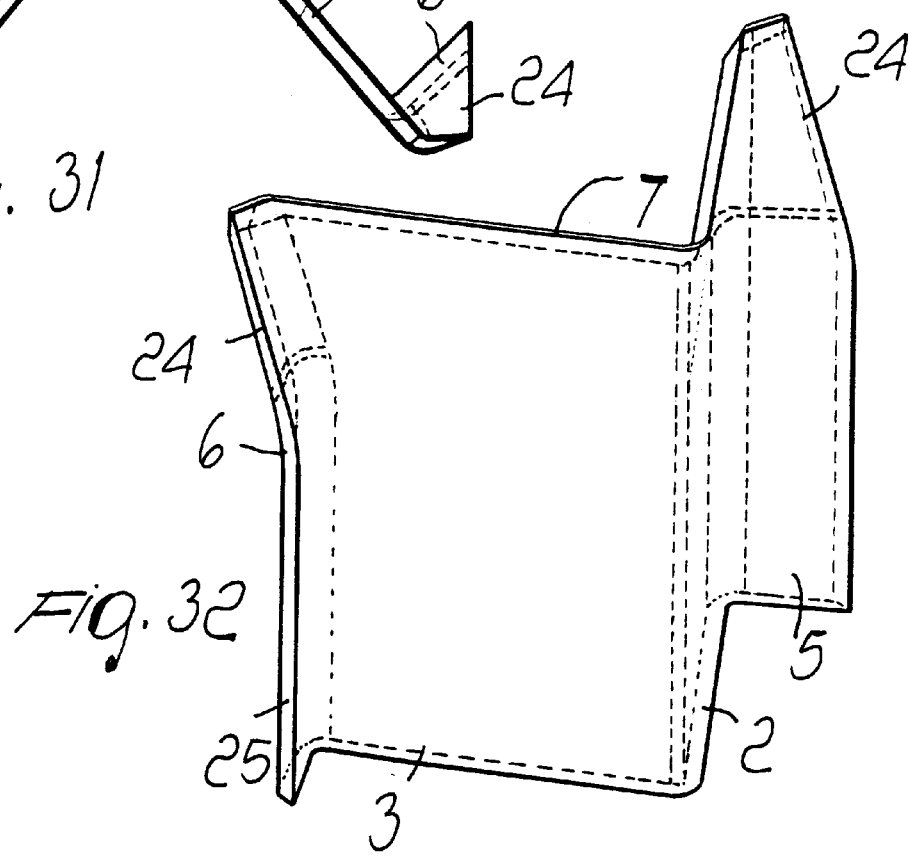

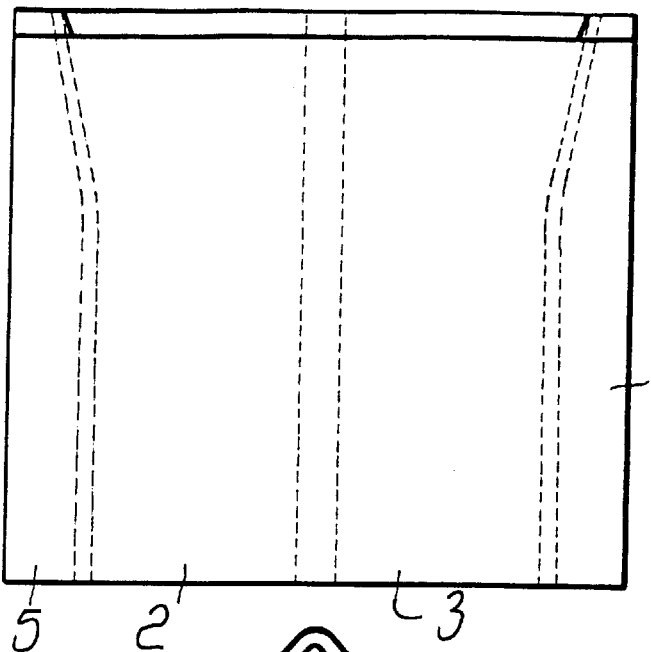
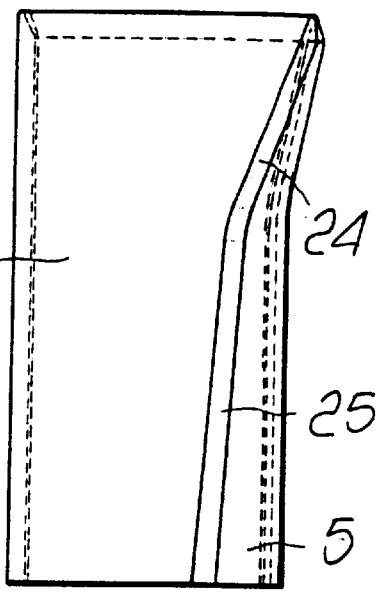
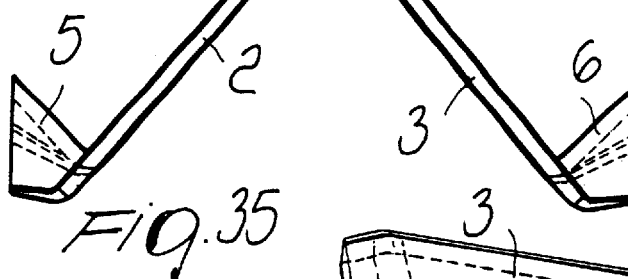
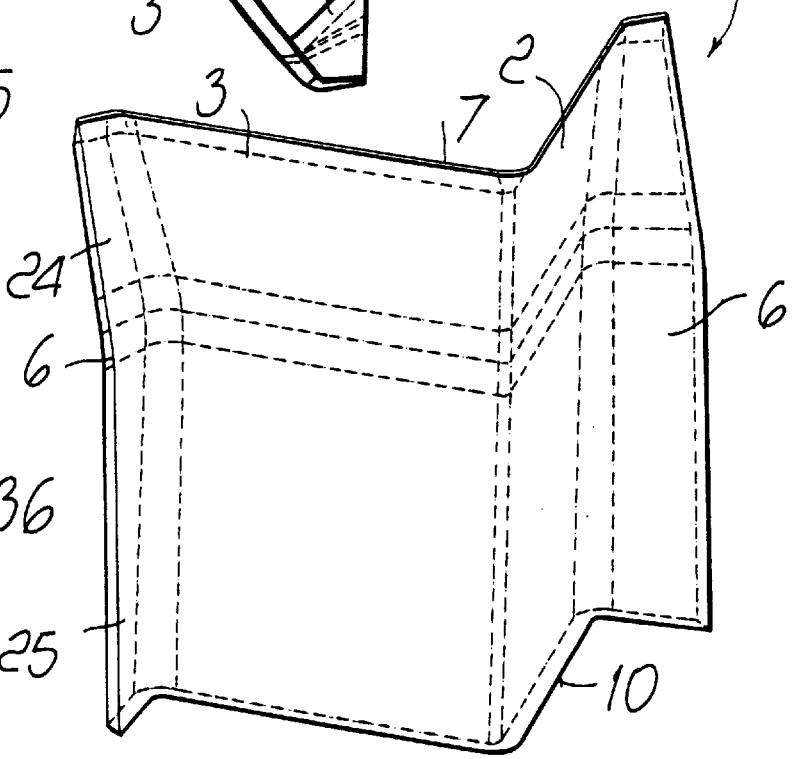

LAMINAR STAPLE FOR CORNER JOINTING PROFILED STRIPS

BACKGROUND OF THE INVENTION

The present invention relates to a laminar staple for corner jointing profiled strips, particularly for manufacturing frames, frameworks and the like.

In the manufacture of borders, frames or similar frameworks made of wood it is known to corner-joint the strips by using laminar staples which are inserted so as to straddle the jointing plane formed by arranging the appropriately chamfered ends of the strips mutually adjacent.

In particular, laminar staples are commercially available which comprise a steel lamina folded so as to form two mutually perpendicular walls and two end ribs or ridges which are perpendicular to the walls and protrude outward, so that the staple assumes a substantially W-shaped profile. Staples of this kind are disclosed in U.S. Pat. Nos. 29,957, 4,681,498 and 5,336,038 and in French patents no. 2,318, 715 and 2,525,949.

To mutually joint two profiled strips, cut for example at an angle of 45° in order to be arranged at right angles to each other, said W-shaped staples are inserted so as to straddle the jointing plane formed by arranging the strips mutually adjacent, so that the edge formed by the perpendicular walls and arranged on the centerline plane of the staple lies on the joint. In order to facilitate insertion, one of the edges having a W-shaped profile of the staples is sharp.

In order to make the joint of the strips as invisible as possible, there is a trend to use staples which are as high as possible in relation to the height of the strips. However, using high staples facilitates the onset of cracks in the exposed surface of the strips. It has been observed that the cracks decrease as the angle formed by the ribs with respect to the walls of the staples increases. However, as this angle increases the force with which the strips are mutually fastened decreases, producing a wider and accordingly more visible jointing line.

SUMMARY OF THE INVENTION

The aim of the present invention is to provide a new kind of staple which allows to substantially eliminate the danger of strip cracking during the insertion of the staples without thereby detracting from the quality of the joint.

Within the scope of this aim, an object of the present invention is to provide a staple which can be inserted by means of conventional stapling machines.

This aim and this object are achieved by a laminar staple comprising two walls arranged at an angle and two ribs which protrude laterally from said walls, said walls and said ribs forming a substantially W-shaped profile which has a sharp edge at one end and a striking edge at the opposite end, characterized in that said ribs enclose, by means of their respective walls, planar angles whose values decrease from said sharp edge to said striking edge.

BRIEF DESCRIPTION OF THE DRAWINGS

Further characteristics and advantages of the present invention will become apparent from the following detailed description on the basis of the accompanying drawings, wherein:

FIG. 3 is a view of the profile of the staple of FIGS. 1 and 2;

FIG. 4 is an enlarged-scale view of the detail shown circled in FIG. 3;

FIGS. 5, 6 and 7 are a front view, a profile view and a perspective view of a first embodiment of the staple;

FIGS. 8, 9 and 10 are a front view, a profile view and a perspective view of a second embodiment of the staple;

FIGS. 11, 12 and 13 are a front view, a profile view and a perspective view of a third embodiment of the staple;

FIGS. 14, 15 and 16 are a front view, a profile view and a perspective view of a fourth embodiment of the staple;

FIGS. 17, 18 and 19 are a front view, a profile view and a perspective view of a fifth embodiment of the staple;

FIGS. 20, 21, 22 and 23 are a front view, a profile view, a perspective view and a side view of a sixth embodiment of the staple;

FIGS. 24, 25 and 26 are a front view, a profile view and a perspective view of a seventh embodiment of the staple;

FIGS. 27, 28 and 29 are a front view, a profile view and a perspective view of an eighth embodiment of the staple;

FIGS. 30, 31, 32 and 33 are a front view, a profile view, a perspective view and a side view of a ninth embodiment of the staple;

FIGS. 34, 35, 36 and 37 are a front view, a profile view, a perspective view and a side view of a tenth embodiment of the staple;

DESCRIPTION OF THE PREFERRED EMBODIMENTS

Figure 1:
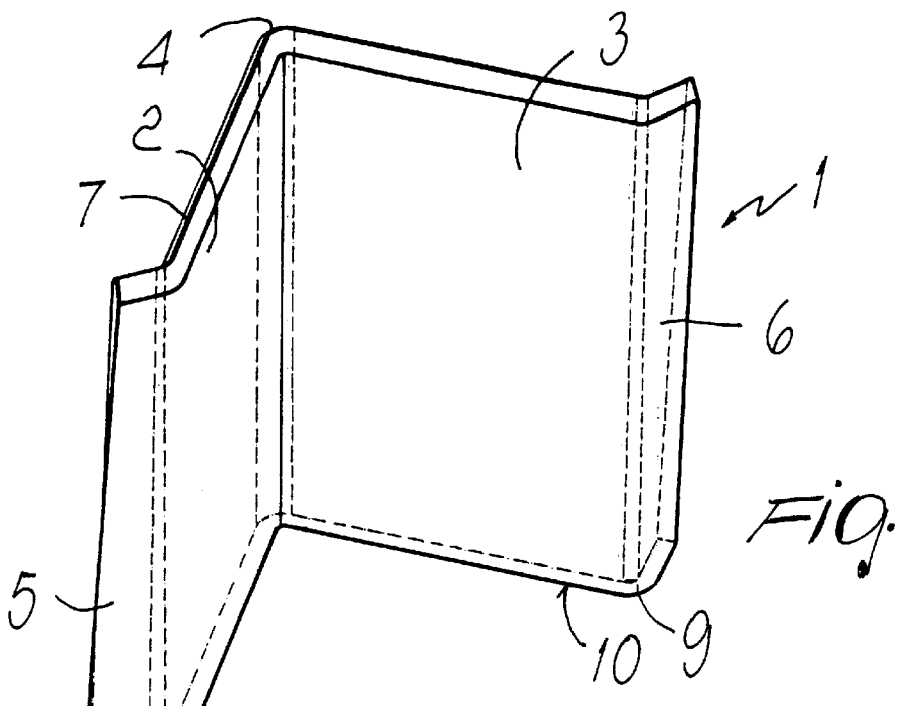
FIG. 1 is a perspective view of a staple according to a first embodiment.
Figure 2:
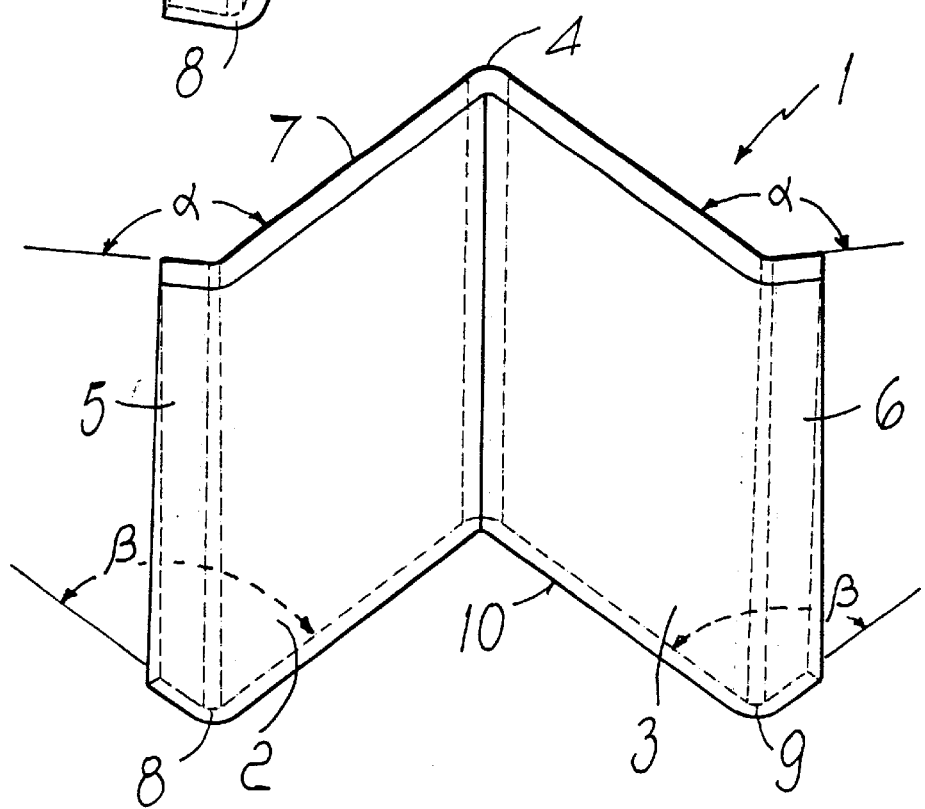
FIG. 2 is a perspective view of the staple of FIG. 1, taken from a different angle.
Figures 38, 39, 40, 41:
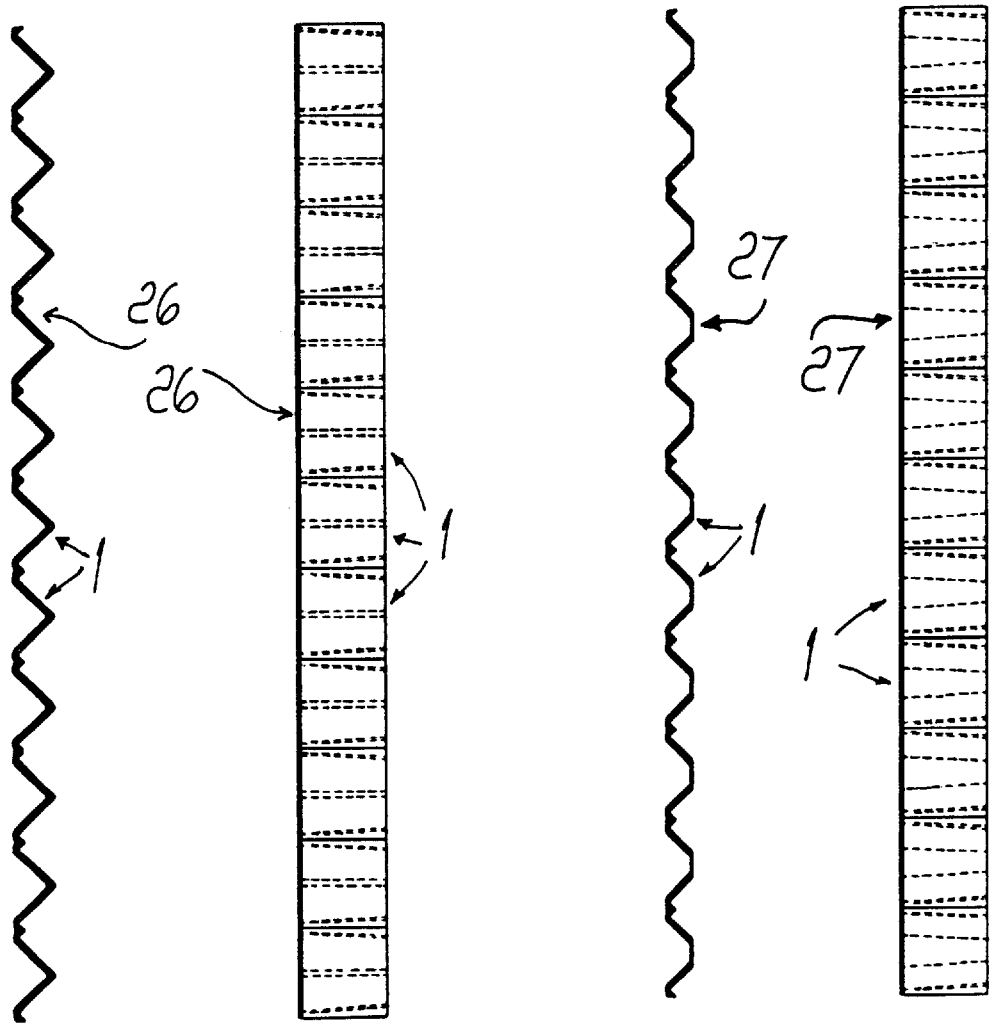
FIGS. 38 and 39 are a profile view and a front view of a ribbon composed of staples according to FIGS. 8–10.
FIGS. 40 and 41 are a profile view and a front view of another ribbon composed of staples according to FIGS. 17–19; and finally

With reference to the above figures, the staple is generally designated by the reference numeral 1 and is composed of a rectangular steel lamina which is folded in half so as to form two rectangular and mutually perpendicular walls 2 and 3 forming a central edge 4 which coincides with the centerline plane P. The border portions of the walls 2 and 3 are in turn folded at an angle with respect to the walls 2 and 3, so as to form two ribs 5 and 6 which protrude outward with respect to the right angle enclosed by the walls 2 and 3 and give the staple a W-shaped profile.

The insertion edge of the staples has a sharp region 7 formed by lateral or bilateral sharpening.

In order to be usable in a stapling machine, the staples 1 are grouped so as to be mutually adjacent, thus forming a pack, and are held together with the aid of suitable adhesives.

The planes of the ribs 5 and 6 and of the walls 2 and 3 form respective edges 8 and 9 which are mutually parallel and lateral with respect to the central edge 4; along said edges 8 and 9, the angle enclosed by the walls 2 and 3 and by the ribs 5 and 6 gradually decreases from one end of the staple to the other. More precisely, the planar angle α defined at the sharp region 7 is greater than the planar angle β formed at the end of the staple that lies opposite the sharp region 7, i.e., the striking edge 10 on which the striking mass of the stapling machine acts.

The ribs 5 and 6 further have a width which increases from the sharp region 7 toward the striking edge 10 while keeping the lateral edges 11 and 12 mutually parallel. By way of this shaping of the ribs 5 and 6, the staple assumes a more open profile which facilitates insertion in strips and prevents cracking of said strips.

The portion of the ribs 5 and 6 located proximate to the striking edge 10, by maintaining an angle β which is narrower than α, produces a traction force on the strips which tends to mutually fasten them, forming a neater joint than obtained with conventional staples. Further, the risk of cracking on the exposed surface of the strips is reduced substantially.

The described staple is susceptible of numerous modifications and variations.

FIGS. 5–7 illustrate a staple in which a rectangular wall 13 is interposed between the walls 2 and 3, forming with them edges 14 and 15 which are parallel to the edges 8 and 9.

FIGS. 8–10 are views of a staple in which the walls 2 and 3 are trapezoidal, so as to form two lateral edges 8 and 9 which diverge toward the sharp region 7. The angle of the edge 4 is constant.

FIGS. 11–13 are views of a staple which differs from the one shown in FIGS. 8–10 in that instead of the central edge there is a wall 28 which is interposed between the walls 2 and 3. The wall 28 is rectangular, so as to form parallel edges 15 and 16. The edges 8 and 9 diverge toward the sharp region 7 and the angle formed by the extensions of the walls 2 and 3 toward the center of the staple decreases toward the striking edge 10.

FIGS. 14–16 are views of a staple which is similar to the one of FIGS. 8–10 but in which the lateral edges 11 and 12 diverge toward the sharp region 7. The angle of the edge 4 is constant.

FIGS. 17–19 are views of a staple with walls 2 and 3 shaped like a parallelogram and an intermediate wall 17 which is shaped like an isosceles trapezoid and which, by means of the walls 2 and 3, forms two edges 18 and 19 which diverge toward the sharp portion 7 but form a constant angle.

FIGS. 20–23 are views of a staple in which each rib 5 and 6 has two portions which form different angles with respect to each other and with respect to the walls 2 and 3 but have aligned outer edges. In this manner, the lateral edges formed by the walls 2 and 3 and by the portions 20 and 21 of the ribs are each composed of two mutually angled portions 22 and 23.

FIGS. 24–26 are views of a staple which is similar to the one of FIGS. 1–4 but in which the angle of the central edge 4 is greater, so that the staple is substantially flatter.

FIGS. 27–29 are views of a staple which is similar to the one of FIGS. 24–26 but in which the edges 8 and 9 are not parallel to the central edge 4 and the angle formed by the walls 2 and 3 decreases toward the striking edge.

FIGS. 30–33 are views of a staple in which the outer edges of the ribs 5 and 6, like the lateral edges formed by the walls 2 and 3 with the ribs 5 and 6, have two mutually angled portions 24 and 25, of which the portion 25 is parallel to the central edge.

FIGS. 34–37 are views of a staple similar to those of FIGS. 30–33, but in which the portions 25 of the edges of the ribs are not parallel but are inclined with respect to the central edge.

FIGS. 38, 39 and 40, 41 are views of two ribbons 26 and 27 formed by joining staples as shown in FIGS. 8–10 and 17–19 respectively. The embodiments of FIGS. 38–41 are particularly adapted for use in automatic stapling machines.

Figure 42:
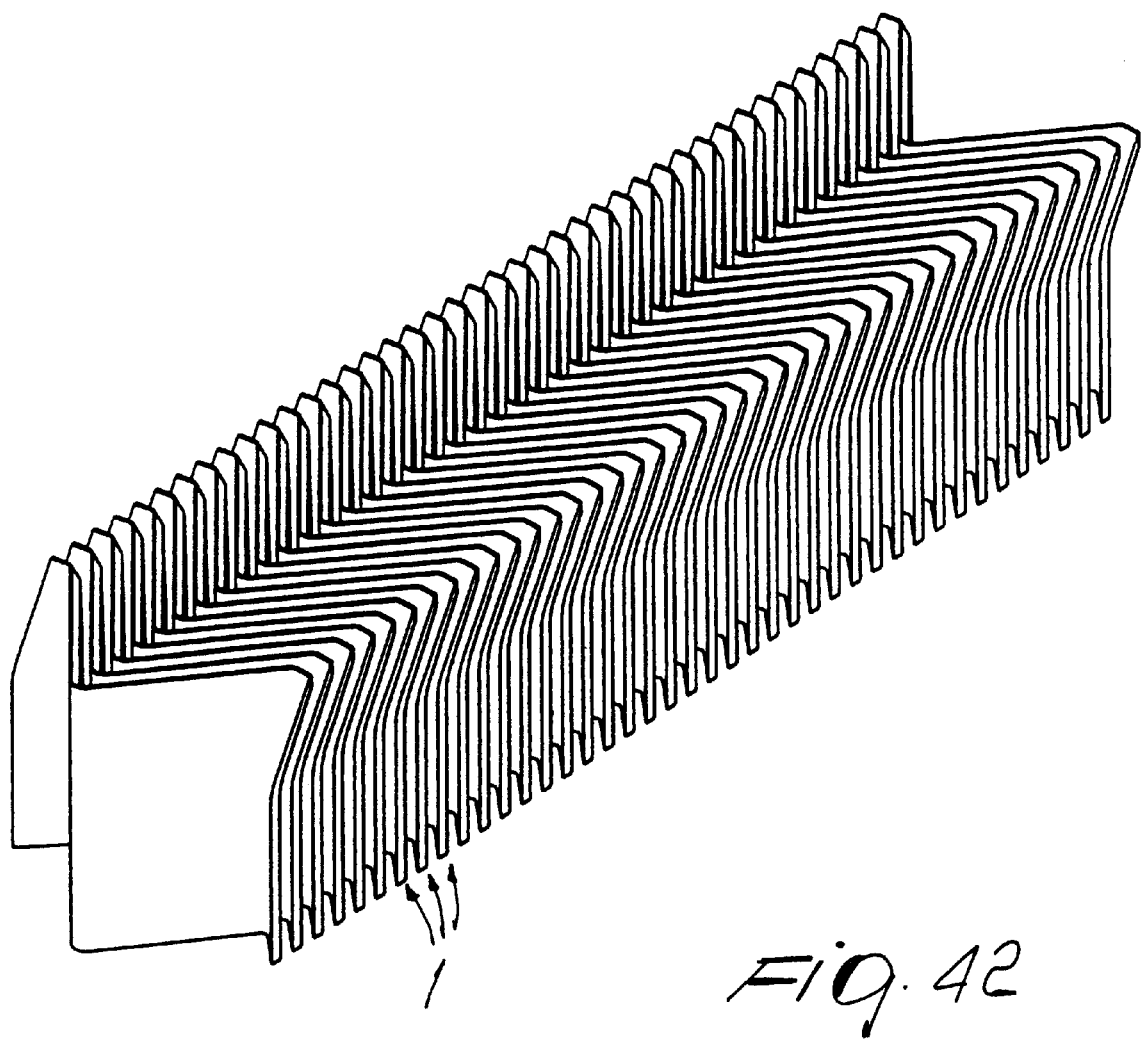
FIG. 42 is a view of a pack composed of staples according to FIGS. 30–33.

However, in order to allow the staples to be usable in stapling machines it is also possible to group the staples 1 face to face in a stack, so that they are mutually adjacent, forming a pack and holding them together by means of suitable adhesives, as shown in FIG. 42, which is a view of a pack composed of staples of the type shown in FIGS. 30–33.

The disclosures in Italian Patent Application No. BO99A000440 from which this application claims priority are incorporated herein by reference.

What is claimed is:

1. A laminar staple comprising a lamina having a centerline plane and folded according to a substantially W-shaped profile having two laminar walls arranged at an angle with respect to said centerline plane and two ribs extending outwardly from said walls, said walls and said ribs having opposite ends defining a sharp edge and a striking edge, wherein said ribs are formed by laminar flat border portions of said walls, said ribs forming an angle with said walls decreasing from said sharp edge to said striking edge.

2. The laminar staple of claim 1, wherein said ribs have a width that increases from said sharp edge toward said striking edge.

3. The laminar staple of claim 2, further comprising an additional wall interposed between said walls, said walls being angled with respect to said additional wall.

4. The laminar staple of claim 1, wherein said walls are substantially perpendicular to each other.

5. The laminar staple of claim 1, wherein each one of said ribs is composed of two portions intersecting each other so as to form an angle.

* * * * *